United States Patent
Lohmar et al.

(10) Patent No.: US 11,647,251 B2
(45) Date of Patent: May 9, 2023

(54) FAST TUNE-IN FOR LOW LATENCY STREAMING

(71) Applicant: Telefonaktiebolaget LM Ericsson (publ), Stockholm (SE)

(72) Inventors: Thorsten Lohmar, Aachen (DE); Ali El Essaili, Aachen (DE); Mohamed Ibrahim, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 20 days.

(21) Appl. No.: 16/629,614

(22) PCT Filed: Jul. 12, 2017

(86) PCT No.: PCT/EP2017/067631
§ 371 (c)(1),
(2) Date: Jan. 9, 2020

(87) PCT Pub. No.: WO2019/011430
PCT Pub. Date: Jan. 17, 2019

(65) Prior Publication Data
US 2020/0404361 A1 Dec. 24, 2020

(51) Int. Cl.
*G06F 13/00* (2006.01)
*H04N 21/438* (2011.01)
(Continued)

(52) U.S. Cl.
CPC ... *H04N 21/4384* (2013.01); *H04N 21/44004* (2013.01); *H04N 21/6373* (2013.01); *H04N 21/8456* (2013.01)

(58) Field of Classification Search
CPC ......... H04N 21/4384; H04N 21/44004; H04N 21/6373; H04N 21/8456; H04N 21/4402; H04N 21/2343
(Continued)

(56) References Cited

U.S. PATENT DOCUMENTS

| | | | |
|---|---|---|---|
| 8,412,841 B1 | 4/2013 | Swaminathan et al. | |
| 8,510,375 B2 * | 8/2013 | Bouazizi | H04N 21/23439 709/203 |

(Continued)

FOREIGN PATENT DOCUMENTS

EP    2908535 A1    8/2015

OTHER PUBLICATIONS

Applicative-Layer Multipath for Low-Latency Adaptive Live Streaming; Patrice Houze et al.; IEEE ICC; May 2016.*
(Continued)

*Primary Examiner* — Kenneth R Coulter
(74) *Attorney, Agent, or Firm* — Coats & Bennett, PLLC

(57) ABSTRACT

The invention relates to a method for operating a media player (100) when receiving a live stream which comprising a sequence of media segments, each media segment comprising a plurality of media fragments. The method comprises —determining a tune-in segment and a tune-in fragment of the live stream, at which the media player intends to start consuming the live stream, —transmitting a media request towards a media providing entity, the media request comprising an indication indicating that the tune-in segment should start with the tune-in fragment as first media fragment, —receiving a media response originating from the media providing entity, the media response comprising the tune-in segment which starts with the tune-in fragment as first media fragment.

10 Claims, 13 Drawing Sheets

(51) Int. Cl.
  *H04N 21/44* (2011.01)
  *H04N 21/6373* (2011.01)
  *H04N 21/845* (2011.01)

(58) Field of Classification Search
  USPC .................. 709/231, 230, 236, 217–219
  See application file for complete search history.

(56) References Cited

U.S. PATENT DOCUMENTS

| | | | | |
|---|---|---|---|---|
| 8,843,596 | B2* | 9/2014 | Goel | H04N 21/234336 |
| | | | | 709/219 |
| 9,237,387 | B2 | 1/2016 | Bocharov et al. | |
| 9,832,534 | B2* | 11/2017 | Tokumo | H04N 21/8456 |
| 10,148,715 | B2* | 12/2018 | Rhyu | H04L 67/02 |
| 11,019,409 | B2* | 5/2021 | Lohmar | H04L 65/65 |
| 2011/0307545 | A1* | 12/2011 | Bouazizi | H04N 21/8456 |
| | | | | 709/203 |
| 2012/0016965 | A1* | 1/2012 | Chen | H04N 21/23439 |
| | | | | 709/219 |
| 2013/0132507 | A1 | 5/2013 | Swaminathan et al. | |
| 2013/0198335 | A1 | 8/2013 | Goel et al. | |
| 2017/0208366 | A1* | 7/2017 | Tokumo | H04N 21/2187 |
| 2017/0230436 | A1* | 8/2017 | Rhyu | H04N 21/6125 |
| 2018/0070148 | A1* | 3/2018 | Tokumo | H04N 21/2187 |
| 2019/0069038 | A1* | 2/2019 | Phillips | H04N 21/64738 |

OTHER PUBLICATIONS

International Organization for Standardization, "Information Technology—Dynamic Adaptive Streaming Over HTTP (DASH)—Part 1: Media Presentation Description and Segment Formats", International Standard, ISO/IEC 23009-1, 2nd Ed., May 15, 2014, pp. 1-176, ISO.

Bouzakaria, N. et al., "Overhead and Performance of Low Latency Live Streaming Using MPEG-DASH", The 5th International Conference on Information, Intelligence, Systems, and Applications, Jul. 7, 2014, pp. 1-6, IEEE.

Swaminathan, V. et al., "Low Latency Live Video Streaming Using HTTP Chunked Encoding", 2011 IEEE 13th International Workshop on Multimedia Signal Processing, Oct. 17, 2011, pp. 1-6, IEEE.

Stockhammer, T., "Dynamic Adaptive Streaming Over HTTP—Standards and Design Principles", Proceedings of the Second Annual ACM Conference on Multimedia Systems, Feb. 23, 2011, pp. 133-143, ACM.

* cited by examiner

Downloaded chunk

Frag#0    Frag#1    Frag#2    Frag#3    Frag#4

Decoder

Frag#4

FAST TUNE-IN FOR LOW LATENCY STREAMING

TECHNICAL FIELD

The present application relates to a method for operating a media player when receiving a live stream which comprises a sequence of media segments and to the corresponding media player. Furthermore, a method for operating a media providing entity is provided which provides the live stream to the media player. Furthermore, a system comprising the media player and the media providing entity is provided and a computer program comprising program code. Additionally, a carrier comprising the computer program is provided.

BACKGROUND

Low latency live streaming with segmented media (aka sequence of files which are individually requested) is known and is based on small segments or multi fragment segments. In the following the term "low latency" or "low end-to-end latency" is synonymously used with the term "low distribution delay". It means that the frames of live video session are distributed as quickly as possible from a packager which is typically provided at the head end system to the decoder on the rendering device. Note, "low" may refer to "less than 5 sec" in some deployments and "less than 1 sec" in other.

Fragmented segments with chunked encoding delivery is used in MPEG (Moving Picture Expert Group)-DASH(Dynamic Adaptive Streaming over HTTP) for low latency applications. Each segment comprises a group of fragments. A group of picture (GoP) can be split over multiple fragments. E.g. each fragment contains a single frame, and the GoP contains 30 frames. A segmenter can make the fragments available for the client/media player of the client once they are created. This reduces the segment availability time and allows a segment downloading and consumption by the client at an earlier point in time. Since the segment generation is still in process, the origin does not know the full size of the segment and the segment is sent via chunked encoding.

For an end-to-end delivery with low latency a segment format is chosen which allows a packager to release portions of the compressed media data before the complete segment is finalized. In case of RTP(Real-Tune Transport Protocol)/MPEG2-TS(Transport Stream) streaming, a Package Evaluation and Selection (PES) packager and stream multiplexer is able to release data on a frame-by-frame basis. By way of example, when the content of the video stream is encoded at 25 frames per second, then the packager and multiplexer is able to release data for the video stream every 40 msec. In adaptive bit rate streaming, ABR streaming, like DASH or HLS(HTTP Live Streaming), traditionally a segment is only released after all data of the segment is available and appended to the segment. In case of a segment length between 6 to 10 sec, segments become only available every 6 to 10 sec.

In more modern packaging formats, the packager is creating multi fragment segments. The benefit of a multi fragment segment is that the end-to-end latency or end-to-end delay is reduced. The packager is able to make individual fragments available and thus mitigates the packager intrinsic delay. When the segment duration is 10 s and the fragment duration is 1 s, the packager may append a new fragment every second.

Since the segment size is only known with the last fragment of the segment, the packager can only start streaming those segments using HTTP Chunked Delivery.

FIG. 1 shows a segment 10 with different fragments 11, wherein the first five fragments are already available whereas fragments number 6 to 10 are not yet available.

In DASH, the media presentation description (MPD) defines an availaibilityStartTime (AST) field which allows to calculate a segment availability start time (SAST) when a certain segment is available on an server for download by the client. The client compares the current wall clock time against the AST and determines by using the segment duration (@d) the segment number of the latest segment. In case of HTTP chunked delivery, to support delivery of fragments, an availabilityTimeOffset (ATO) field is added to the MPD to indicate an earlier availability of segment parts at the server and the usage of HTTP Chunked Transfer Encoding for delivery. This allows the client or media player to start fetching chunks before the full segment is available at the server. FIG. 2 illustrates the procedures of a Segment N becoming available. In case of regular segment delivery, the server makes the segment available once the complete segment is ready and this is calculated using at least the AST, the segment duration and the local wall-clock time. In step S21, the client requests the segment from the server and in step S22 the full segment is transmitted to the client. In case of HTTP chunked delivery, the first chunk is made available earlier than the full segment (cf. $SAST_N$) and this offset is indicated by the ATO. In principle, the chunk can include parts, one or multiple fragments. The client starts fetching the chunks in step 23 as indicated by the ATO and the SAST for segment N, and the chunks are transmitted in step S24.

Let segment N be the Nth segment in the DASH media presentation. The Segment Availability Start Time (SAST) of a segment N (denoted as $SAST_N$) is calculated as $$SAST_N = AST + @d + (N-1)*@d, N \in (1, \ldots) \quad (1)$$

for single Period content (in case of Multi-Period content, the segment numbering is relative to the period and the period start is relative to the AST, so a bit more complicated formula). The SAST calculation becomes a bit more complicated for multi-period content, because segment N is then the Nth segment in the period.

Note, it is allowed to create segments and fragments without an IDR (Instantaneous Decoder Refresh) frame at the beginning. For example, the CMAF (Common Media Application Format) low latency chunking foresees fragments without IDR frames, thus, the frames of a GoP are partitioned into multiple fragments. This reduced the packager delay contribution.

Push solutions like WebRTC(Web Real Time Communications) or MPEG2-TS/(RTP)/UDP(Uber Datagram Protocol): Other media streaming solution than MPEG DASH or HLS require dedicated streaming servers for support. WebRTC is defined as a bidirectional delivery scheme and it requires a special UDP server, MPEG2-TS on (RTP) and UDP require dedicated UDP pumps. Neither WebRTC nor MPEG/(RTP)/UDP can work with unmodified HTTP servers, in particular for scalable distribution scenarios.

A default solution for Low Latency Streaming is "Short segments" and even segments without IDR frames (i.e. partial GoP segments). Each segment is uniquely identified by an HTTP URL. There are two problems when working with short segments:
 (A): the transaction rate (i.e. HTTP request/response transaction rate) is increased with the decrease of segment duration. The short the segment duration, the more frequently a client needs to request segments. The CDN (Content Delivery Network) and the origin server need to sustain a higher number of HTTP requests per second and for each request first identify the requested resource, then locating the requested resource in the local memory/hard disk and last start streaming the response to the client.

(B): The shorter the segments the more precise the time synchronization between client and server is.

In case of Multi-Fragment Segments, when a client tunes-in to the streaming session shortly after the creation of a new segment (i.e. the client waits until a new segment is just created and then starts fetching segments), then the tune-in is often slow and the latency is low, because the client delays the tune-in in such a way that the amount of "old" data is limited. Assuming a scenario which uses 10 sec segments, containing 1 sec or 0.5 sec fragments with a packager, which makes fragments available before the full segment. Furthermore it is assumed that the player buffers some media data before decoding and rendering starts. For example the player buffers 2 sec of media data before playout starts.

When the player fetches the latest segment first, then the tune-in delay is determined by the buffer duration. When the player tunes in in the buffer duration behind the live edge (e.g. 2 sec behind the latest segment), then the link bitrate determines the tune-in.

Low Latency Delivery is used synonymously with low e2e delivery delay, meaning the time it takes for a encoding picture to travel through the delivery pipe until the time of decoding (i.e. incl. client side buffering).

Today, there are some low latency protocols—like RTMP (Real Time Messaging Protocol)—and some low latency delivery solutions. Today's default Low Latency delivery solution with DASH is to work with short DASH segments. This solution increases the transaction rate on CDN, since the client has to request a segment more frequently, which is overloading CDNs. Therefore CDNs prefer to operate with large duration segments. The problem with the existing solution is that in case the client tune-in occurs during the middle of the segment, it has to start downloading the segment fragments from the beginning. Hence it will have an offset from the live edge equals to the difference between the live edge and the start of the segment. In case of using 10 second segment and the client tune-in at the middle of the segment, it has to download fragment #1 which is 5 seconds behind the live edge, while it should download fragment #5. Such behavior is undesirable for systems that require low latency play-out.

FIG. 3 illustrates the construction of low latency segments, which is suitable for low latency delivery. The segment contains 10 sec worth of media data and 1 sec fragments. The packager makes a segment available on a fragment by fragment bases appending each newly available fragment to the end of the segment. When the segment duration is reached, the packager creates the next segment and continues appending newly created fragments to the new segment. In the figure, fragments 1 to 5 are already available and the fragment 6 to 10 are not available. It should be noted, that every compliant media segment starts with a specific header (styp) to indicate the compatibility of the segment.

A media player can start fetching the segment using HTTP Chunked Transfer Encoding. HTTP chunked delivery allows the client to track the end of the HTTP response, when the HTTP response size is not known at the time of starting the response. Tracking the end of response is important to re-use the TCP(Transmission Control Protocol) connection for multiple HTTP transactions.

Typically, segments, although made available with chunked delivery, shall be cached by the content delivery network within caching nodes and shall be served from the caches with regular responses when the all fragment of the segment are available. For example, clients in time shift mode (i.e. the client requests video content e.g. several minutes behind the live edge) are accessing the content. Further, the segment shall remain in the CDN for VoD (Video on Demand) access. For tune-in, now a very specific problem occurs: When the client downloads from the beginning of the segment, then the player gets old information (the fragments at the beginning of a segment are much older than the fragments at the end of the segment). In FIG. 4, the first fragment contains already 5 sec old information. The client would need to know the byte offset of fragment 5 to issue an HTTP byte range request (i.e. an HTTP Request which contains the HTTP Range header field). However, fragment byte offsets cannot be pre-determined, since fragment sizes depend on the size of encoded frames.

Accordingly, a need exists to create a response which is cacheable for a short duration so that several clients can benefit from the same cached tune-in segment. The packager shall not make a dedicated tune-in representation available as this would mean to multiply the number of copies in the content delivery network. Further a need exists to allow a fast tune-in into a live stream.

SUMMARY

This need is met by the features of the independent claims. Further aspects are described by the dependent claims.

According to a first aspect, a method for operating a media player when receiving a live stream is provided which comprises a sequence of media segments and wherein each media segment comprises a plurality of media fragments. According to one step of the method a tune-in segment and a tune-in fragment of the livestream is determined at which the media player intends to start consuming the livestream. Furthermore, a media request is transmitted towards the media providing entity wherein the media request comprises an indication indicating that the tune-in segment should start with the tune-in fragment as first media fragment. The media player then receives a media response originating from the media providing entity wherein the media response comprises the tune-in segment which starts with the tune-in fragment as first media fragment.

Furthermore, the corresponding media player is provided comprising a memory and at least one processing unit wherein the memory contains instructions executable by the at least one processing unit, wherein the media player is operative to function as discussed above or described in more detail below.

The media player transmits a certain media request to the media providing entity which indicates that the tune-in segment should not start with the first fragment as it is the case in all the other segments, but the media player asks for a tune-in segment in which the tune-in fragment should be the first fragment in the segment which corresponds to the fragment at which the media player intends to start consuming the livestream. Accordingly, the tune-in segment comprises a number of fragments less than the other segments as the tune-in segment will not contain the usual number of fragments, but will contain as first fragment the fragment at which the tune-in is desired.

Furthermore, a method for operating the corresponding media providing entity is provided which provides the livestream to the media player and wherein the livestream comprises a sequence of media segments and wherein each media segment comprises a plurality of media fragments. The media providing entity receives a request comprising an indication about a tune-in fragment of a tune-in segment at which the media player intends to start consuming the livestream. The indication indicates that the tune-in segment should start with the tune-in fragment as first media fragment. The media providing entity then generates the tune-in segment which starts as first media fragment with the tune-in fragment and which comprises a number of media fragments that is smaller than an average number of fragments contained in the other segments of the livestream. Furthermore, the tune-in segment with the media response is transmitted in direction of the media player.

Accordingly, the media providing entity creates a special tune-in segment which does not include the leading fragments in which the receiving entity is not interested.

According to another aspect, a method for operating a media providing entity is provided wherein the media providing entity provides the livestream to the media player and wherein the livestream comprises a sequence of media segments wherein the media segments comprise a defined number fragments M of media with M>1. The media providing entity receives a media request requesting initialization information of the live stream at a moment where a segment x is the latest available segment at the media providing entity and for which not all M media fragments are already available when the media request is received. Furthermore, it determines a latest available fragment in the segment X that is available when the media request is received. Additionally, a first segment of the livestream for the media player is generated wherein the first segment comprises the initialization information of the media stream and comprises the latest available fragment of segment X and remaining fragments of segment X following the latest available fragment.

Furthermore, the corresponding media providing entity is provided which operates as discussed above or as discussed in more detail below. In this embodiment, the tune-in decision is moved to the media providing entity, the origin. Even though the media player determines the next available segment of the stream, the media providing entity responds with an initialization segment which includes the remaining fragments of the segment which was only partially available when the tune-in decision was made. The media providing entity then transmits a segment including the initialization information and the fragments of the preceding segment which were not available at the tune-in decision.

According to a further aspect, a method for operating a media player when receiving a livestream is provided wherein the livestream comprises a sequence of media segments and wherein the media segments comprise a number M of media fragments with M>1. The media player determines the number of the latest available segment (in order to determine the segment URL of the latest available segment) of the livestream which is available at the media providing entity and from which only a number Y of fragments with Y being smaller than M are available. Furthermore the latest available fragment is determined. A tune-in fragment is then determined based on the latest available fragment and a buffer depth of a buffer used at the media player The media player then starts downloading the latest available segment wherein the number Y of fragments is received. It starts downloading the latest available segment, wherein the number Y of fragments are received, and discards, from the Y fragments all fragments until the tune-in fragment among the Y fragments is reached. The media player then plays out the live stream with the tune-in fragment among the Y fragments as first media fragment.

Furthermore, the corresponding media player is provided operating as discussed above or discussed in further detail below. Here, the target of the media player is to start play out from the latest fragment possible. This means that at the beginning of the tune-in, the media player downloads a burst of Y chunks which contains several fragments, e.g. five fragments. The media player then discards all the fragments in the burst of data received at tune-in except the last fragment. If five fragments are found in the start-up burst, it discards the first four and passes only the fifth fragment on for replay.

According to another embodiment, a method for operating a media player is provided when receiving a livestream which comprises a sequence of media segments, each media segment comprising a plurality of media fragments. The method comprises determining a tune-in segment and a tune-in fragment of the live stream, at which the media player intends to start consuming the live stream. Furthermore a request for a fragment index file is transmitted towards a media providing entity, the fragment index file comprising offset information allowing the media player to determine by how many bytes the tune-in fragment is offset from the beginning of the tune-in segment. A response is received in response to the transmitted request, the response comprising the requested offset information. Then the byte offset of the tune-in fragment in the tune-in segment is determined based on the received offset information, and a byte range request is transmitted towards the media providing entity, the byte range request being an open range request requesting a transmission of the tune-in segment starting with the fragments after the byte offset such that the tune-in segment comprises as fragments the tune-in fragment as first media fragment in the open range and any later fragments of the tune-in segment after the tune-in fragment. The tune-in segment may be the latest available segment or may be an already available segment, depending on the buffering behavior of the media player.

Furthermore, the corresponding player is provided.

Furthermore, a system comprising the media player and the media providing entity as discussed above is provided.

Additionally, a computer program comprising a program code to be executed by at least one processor of the media player or of the media providing entity is provided wherein execution of the program code causes the at least one processor to execute a method as discussed or as discussed above or as discussed in detail below. Additionally, a carrier comprising the computer program is provided wherein the carrier is one of an electronic signal, optical signal, radio signal, or computer readable storage medium.

It is to be understood that the features mentioned above and the features yet to be explained below can be used not only in the respective combinations indicated, but also in other combinations or in isolation without departing from the scope of the present application. Features of the above-mentioned aspects and embodiments may be combined with each other in other embodiments unless explicitly mentioned otherwise.

BRIEF DESCRIPTION OF THE DRAWINGS

The foregoing and additional features and effects of the application will become apparent from the following

DETAILED DESCRIPTION OF EMBODIMENTS

Figure 1:
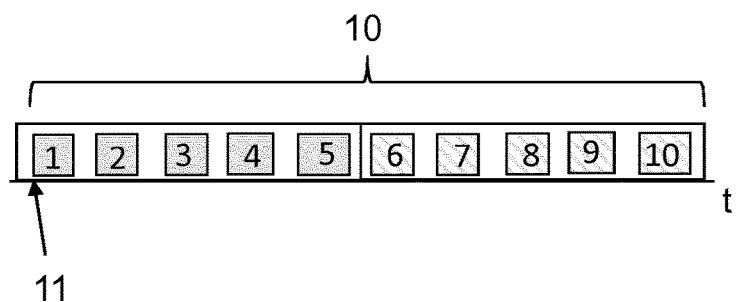
FIG. 1 shows an example representation of a segment construction comprising plurality of fragments.
Figure 2:
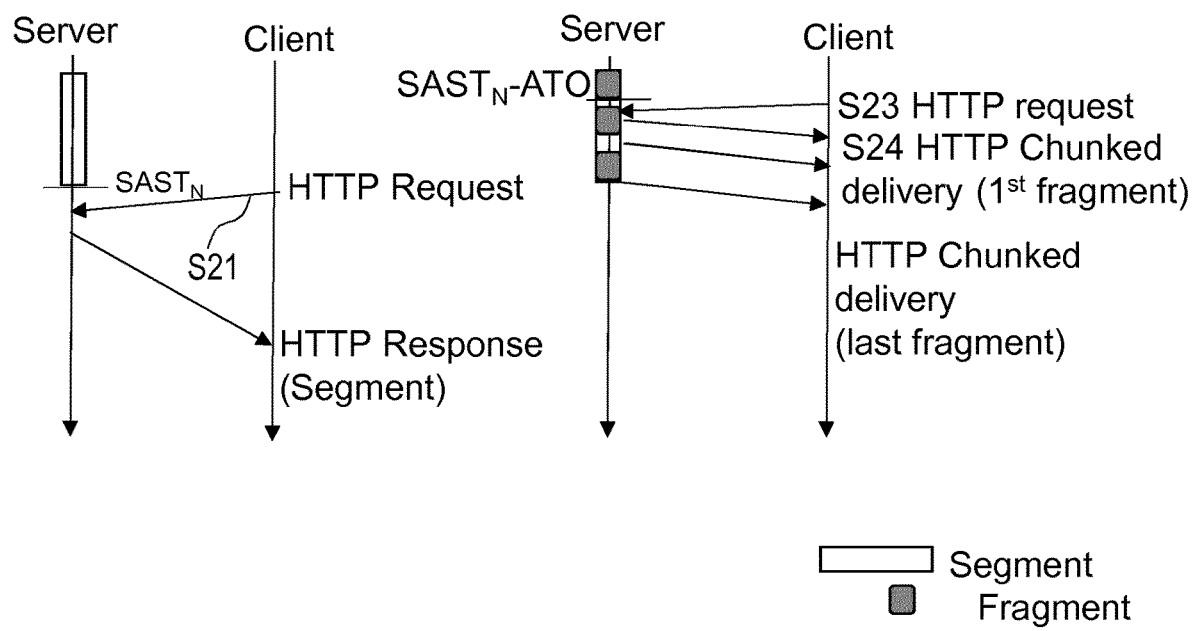
FIG. 2 shows an example message exchange and a comparison between a regular segment delivery shown on the left side and a chunked delivery using segment fragmentation shown on the right side as known in the art.

In the following embodiments of the invention will be described in detail with reference to the accompanying drawings. It is to be understood that the following description of embodiments is not to be taken in a limiting sense. The scope of the invention is not intended to be limited by the embodiments described hereinafter or by the drawings which are to be illustrative only.

The drawings are to be regarded as being schematic representations and elements illustrated in the drawings are not necessarily shown to scale. Rather, the various elements are represented such that their function and general purpose becomes apparent to a person skilled in the art. Any connection or coupling between functional blocks, devices, components or physical or functional units shown in the drawings and described hereinafter may also be implemented by an indirect connection or coupling. A coupling between components may be established over a wired or wireless connection. Functional blocks may be implemented in hardware, software, firmware or a combination thereof.

In the following different options are discussed how fast start-up of a low latency livestreaming channel is obtained.

In a first option a special tune-in segment is created which does not include the leading fragments of a segment. The player provides information to create the special tune-in segment with the request message.

In a second option discussed below the fragments of the segment in process are sent along with the initialization segment for the representation.

In a third option the client is enabled to discard the leading fragments of a segment.

Furthermore, in a fourth option a so-called fragment-index file is requested with a first request. The fragment index file contains the byte offsets of the fragments within the associated segment. This fragment index file enables the client to determine the range request information for the tune-in fragment of the segment.

In the following the first of the four options discussed above is explained in more detail. Note, the description focuses on the movie fragment box (moof) and the media data box (Mdat) within a fragment. Additional boxes may be present, but are not of interest in the embodiment.

a)

Figure 3:
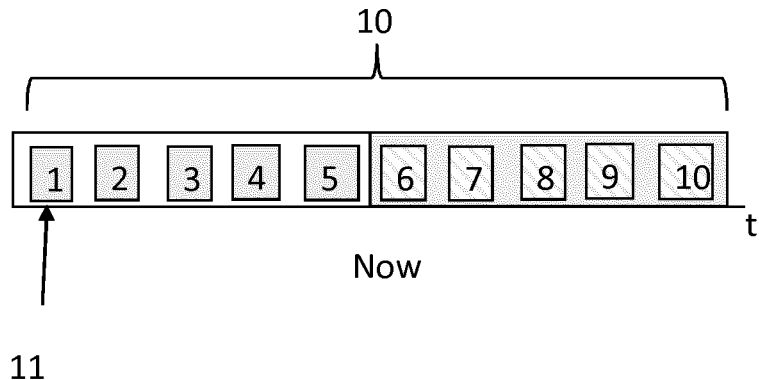
FIG. 3 shows an example representation of a segment in which not all fragments are yet available when a user wants to tune-in into a livestream.
Figure 4:
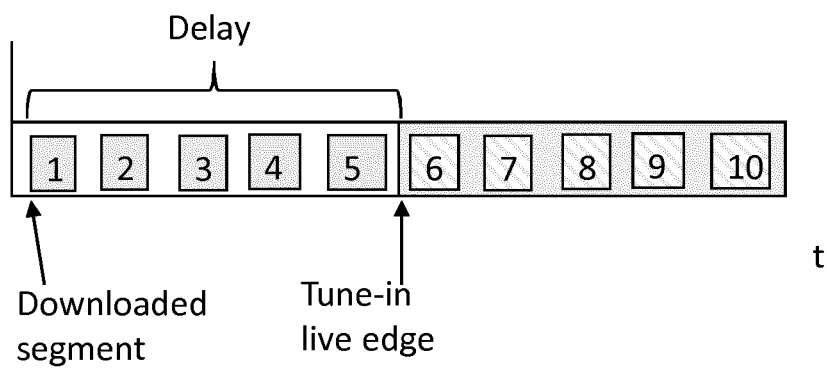
FIG. 4 shows an example schematic view of a segment allowing to illustrate the tune-in delay problem when not all fragments of a segment are available for a transmission when a livestream should be started.

As will be explained below, a special tune-in segment is generated by a media providing entity as disclosed in connection with FIG. 5. The generated tune-in segment 50 comprises an indication 51 indicating the segment type, e.g. the indication as "styp" followed by a number of fragments 52 which is smaller than the normal number of fragments contained in the segment such as shown in FIGS. 3 and 4. The first fragment is the tune-in fragment, which may be the latest available fragment indicated by fragment number 5 in the example shown followed by the other segments 6 to 10. Alternatively, the tune-in fragment may be smaller than the latest available fragment, e.g. 3, so that the client can fetch fragments 3, 4 and 5. This special tune-in segment 50 avoids downloading here the leading fragments 1, 2, 3, 4 since the player is interested to tune-in as close as (or according to the player buffering algorithm) possible to the live point. In order to signal the request for a special tune-in segment from the media player to the media providing entity, a suffix or header may be added to the URL of the segment requested at tune-in. The suffix or the header may contain the requested fragment number.

The client or media player can calculate the fragment number by using the fragment duration as will be discussed in more detail below. The fragment duration can be furthermore added as a new parameter to the media presentation description, MPD. The manifest, MPD, contains a template description of the suffix, URL path component or header information, which is used by the client in combination with the calculated tune-in fragment and tune-in segment information to create the HTTP request. An intermedia media cache receives the client request and forwards it to the media providing entity or origin wherein the latter processes the suffix or URL path component or request header indication and sends the requested segments starting with the required fragment. The media providing entity can furthermore set the validity of this response via HTTP header to the remaining duration of the segment. intermediate media caches respect this HTTP cache control headers. In the following an example is discussed in which each segment may contain 10 fragments. The media player calculates the segment number in a first step. The client combines the calculated segment number with the segment URL template to the segment URL (as depicted). Then it determines the fragment number in a second step. The regular segment URL as defined would be http://ex.com/frags/video-4200.m4s In order to indicate to the media providing entity that from fragment number 5 onwards a segment should be received the following different options are possible:
http://ex.com/frags/video-4200.m4s?frag=5
or
http://ex.com/frags/frag5/video-4200.m4s
or
http://ex.com/frags/video-4200.m4s/frag5
or
http://ex.com/frags/video-4200.m4s with an HTTP header In order to enable the media player to create such segment URLs, the—manifest, MPD, may be extended with fragment duration and a start-up URL template. The start-up URL template may allow the client to append query line parameters or may enable the client to insert the fragment number into the path. When different clients are precisely time synchronized special tune-in URLs may be used with the following features:
- The media presentation description, MPD can contain the segment duration and fragment duration.
- The MPD can furthermore contain a description how to construct a tune-in segment URL containing the desired tune-in fragment. The client or media player appends a fragment offset.
- The client calculates the latest available fragment and deduces the buffer duration to determine the tune-in fragment within the tune-in segment.

Figure 6:
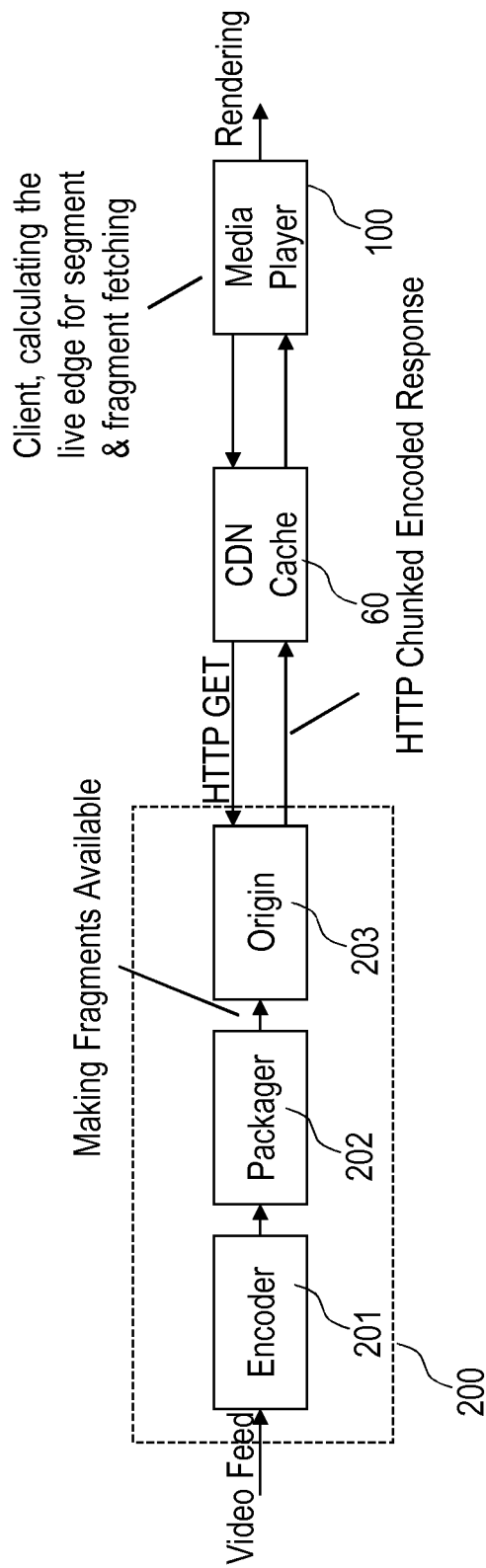
FIG. 6 shows a schematic representation of an architecture of a system used in the invention when a video stream is streamed to a client.

The architecture in which the present embodiment may be incorporated can be a regular unicast video streaming architecture as shown in FIG. 6 with the following modifications. A video feed, by way of example from a live video camera, is fed to an encoder 201. The encoder may comprise the video frames, e.g. using H.264 or HEVC (high efficiency video coding) and creates a regular GoP structure. By way of example, the encoder 201 produces 1 sec GoP's resulting in one IDR frame per second.

The encoder 201 pushes the coded frames into a packager 202 which may add timestamps and other metadata to the stream. The packager is configured to produce multi fragment segments. By way of example, the packager 202 produces 10 sec segments with ten 1 sec fragments. After creating a segment the packager 202 is appending fragments until the segment is completely available. The thus created segment is then fed to the origin server 203. As shown by the dashed line the encoder, the packager, and the origin may be the video providing entity 200. The video providing entity need not to be provided at a single location. By way of example, the packager 202 and the HTTP origin server 203 may be collocated on the same node or may be deployed on separate nodes. In the first case, the packager 202 appends fragments using local file system operations. In the second case, the packager may use a protocol like WebDAV with HTTP chunked transfer encoding for the upload. Individual fragments may be fetched from the origin 203 before the full segment is available. When the client or media player 100 is requesting a segment which is not fully available the origin 203 uses HTTP chunked transfer encoding to append new fragments to the HTTP response. The video segments may be transferred to a CDN cache 60 from where they are transmitted to the media player 200. If chunked transfer encoding is not used the origin 203 can use a regular HTTP response and may add the content length into the HTTP header fields. The way the media player calculates the currently present live edge is explained in further detail below.

Figure 7:
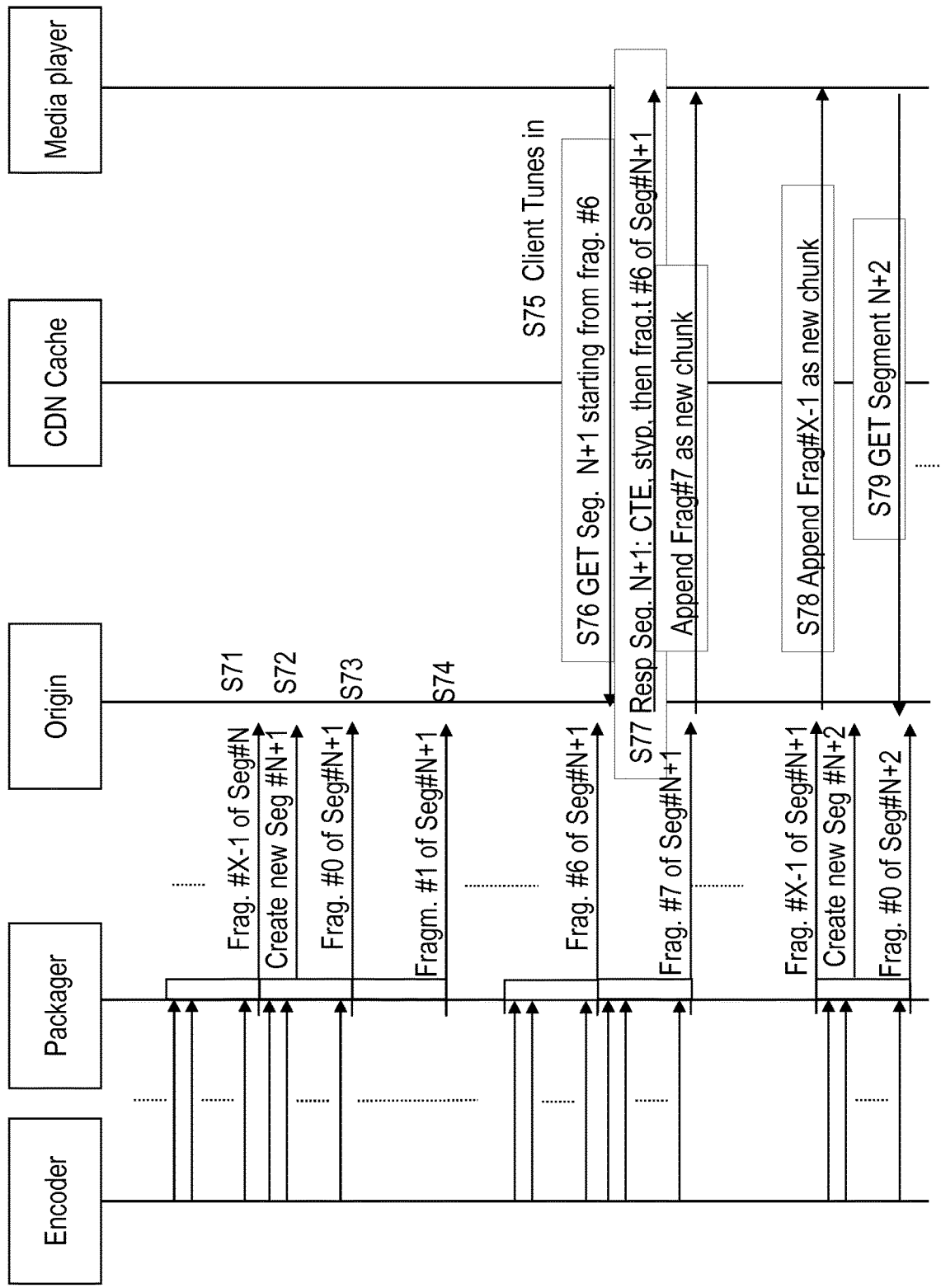
FIG. 7 shows an example message exchange between involved entities when the special tune-in segment as shown in FIG. 5 is used for streaming a live video.

In connection with FIG. 7 a message exchange between the entities involved is explained in more detail. The encoder is continuously receiving video frames from a video source, e.g. uncompressed frames from a live camera. The video frames come into the encoder at a given frame rate such as 25 frames per seconds. The packager is then configured to gather Y frames into a fragment wherein a segment contains X frames with each Y frames. By way of example, the packager produces 1 sec fragments contained in a 10 sec segment.

The encoding and upload process may already run a certain period of time.

At step S71, the packager has finalized the last fragment of Segment #N and the complete Seg #N is available for fetching. When the packager makes the segment available through the file system to the origin, then the packager is closing the file. When the packager uses a HTTP protocol like WebDAV for uploading together with HTTP Chunked Transfer Encoding, then the packager sends a last chunk indication (i.e. a chunk of size zero) so that the origin can close the file.

At step S72, the packager creates a new segment by creating a new file on the origin. At least the file name of the new segment is known. Optionally, also the styp body of the new segment is available.

The styp box may be provided as separate HTTP chunk or as separate file or a new notification is triggered after styp writing. As a result, the origin has stored the styp box separately or has stored the end-byte offset.

At step S73, the first fragment (i.e. frag #0) is appended to the segment. The origin stores at least the end-byte offset of the fragment in a separate table. Optionally, the origin stores the entire HTTP chunks separately in memory.

At step S74, the second fragment (i.e. frag #1) is appended to the segment. As for S73, the origin server stores either at least the end-byte offset or the complete chunk.

The steps S71 to step S74 are continuously repeated. The origin keeps track of every HTTP Chunk boundary, either using byte offsets or complete chunks or other methods.

At step S75, an HTTP client prepares to tune in. The HTTP client calculates the tune-in segment and tune-in fragment per a formula (see fragment index determination, described further below).

At step S76, the client issues a new HTTP Get request, asking the origin for Segment #N−1 starting from fragment #6. Note this was the result of the tune-in calculation. There are various ways to create the HTTP Request URL, expressing Segment #N−1 at a certain fragment, as described below. The HTTP origin, receiving this new request, is able to work out the desired fragment number and the desired segment number.

At step S77, the origin creates the response: Since the creation of the segment is still on-going the origin uses HTTP Chunked transfer encoding. The server creates a new tune-in segment by
- a: The start is the first HTTP chunk, as received during step S72. The first HTTP chunk contains the styp box.
- b: The server appends the HTTP chunk, associated to fragment #6. When the origin is only counting HTTP chunks and when an HTTP chunk is containing exactly one fragment, then the origin combines the 1st HTTP chunk with the 7th HTTP chunk into the response.
- c: the HTTP origin appends newly received HTTP chunks (aka fragments). Here, the 8th HTTP chunk is appended when available.

At step S78, the HTTP origin appends the last HTTP chunks (aka fragments) of the segment. After the last HTTP chunk is sent, the origin sends a last chunk indication (i.e. chunk with size zero).

At step S79, the client requests the next segment (i.e. seg #N+2) from the beginning. Since the segment is still in production, the origin use HTTP Chunked Transfer Encoding.

In the following a description of the URLs is provided to express that the response should only contain a partial segment.

Special tune-in segments should have unique URLs, when the origin is creating the tune-in segments. When a cache is creating the tune-in segments, then the cache can rely on a new HTTP header to separate tune-in segment requests from full segment requests.

When the origin creates the tune-in segments, there should be a unique URL for each different tune-in segment, i.e. only a limited number of combinations per representation exist:
- The first fragment is missing. The segment contains only the styp and then from second fragment onwards.
- The first and the second fragments are missing.
- The first three fragments are missing.
- And so on, until the segment contains only the styp and the last fragment of the segment.
- Other ISO-BMFF boxes may be present The request URL template should be described in the MPD manifest as a separate element or attribute. The attribute may indicate a pre-defined text string or may indicate a template. For example, a standardized (i.e. pre-defined) text string may say "frag=$frag$", indicating that always the string "frag=" is present for tune.in segments, when the MPD allows clients to request tune-in segments. Or, the MPD may contain a template, e.g. an new attribute is defined like 'tunein="f=$Frag$"', which allows for more flexibility.

The tune-in fragment indication may be inserted into the URL path of the segment (for instance http://ex.com/frags/frag5/video-4200.m4s) or may be appended to the URL (for instance http://ex.com/frags/video-4200.m4s/frag5) or may be appended to the URL as query line parameter (for instance http://ex.com/frags/video-4200.m4s?frag5).

It should be noted, that the origin sets a rather short content expire cache control, in order to remove these segments quickly from the cache. Tune-in segments are typically only relevant, when the client wants to stream as close as possible from the live edge. When a client is in time shift, the client can consume segments from the beginning. Note, tune-in segments may also be relevant when switching representations, e.g. from a high quality representation to a lower quality representation. Tune-in segments may allow clients to switch in the middle of a segment, thus, may tune-in to another representation.

Figure 8:
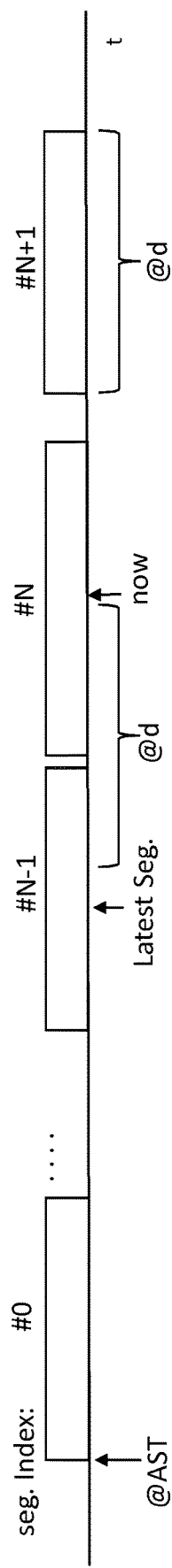
FIG. 8 shows a schematic representation of a time frame when a user wants to tune-in into a live video and the latest segment is not yet fully available.

In the following the fragment index determination is explained in more detail in connection with FIG. 8 and the following.

Typically, the client should calculate the availability start time of the tune-in segment, given the time information provided in the MPD. FIG. 8 explains the segment availability time for regular tune-in scenario occurs, considering DASH Single Period Content (the calculation is in principle similar in case of multi period, but relative to the period start).

Given the following parameters driven from the MPD, the media player is able to calculate the latest available segment and fragment wherein @ indicates that the parameter is an MPD parameter:

@AST is the availability start time of the initialization segment, where the packager starts generating the first segment. The first segment is available at @AST+@d, where @d is the segment duration. @fd is the fragment duration. "now" is the current time of tune-in, @ATO: it is the availability start time offset (also called availabilityTimeOffset (ATO) in the standard), a parameter used to modify the availability start time of the first segment.

@SN is the start number of the first segment. Note, DASH does not require that the first segment starts with index 0. So, the segment availability calculation is in principle to first calculate a segment index based on the wall clock time and then apply the Start Number of the sequence.

Typically, a client would calculate the number of the currently available Segment ($SAST_{N-1}$) using the following formula. Note, the number of the segment is used in the segment template to complete the segment URL:

$$Seg_{N-1} = \lfloor SAST_{N-1} \rfloor = \left[\frac{now - @AST - @d}{@d}\right]_{floor} + @SN \quad (2)$$

Formula 2 is explaining the basic calculation for SAST, which typically works for downloading segments without chunked encoding support. Showing the example in FIG. 8, if the client tune-in at time now (i.e. during the creation of seg #N), the client calculates the time since @AST (value from the manifest, MPD) and subtract the segment duration @d (value from the manifest, MPD), the result is divided by @d duration will result in the latest available segment index N−1.

Figure 9:
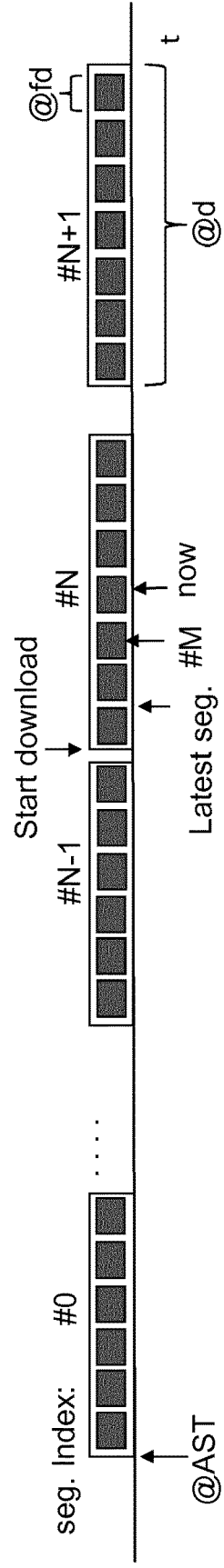
FIG. 9 shows a situation similar as in FIG. 8 wherein a chunked encoding transmission technology is used.

For chunked encoding calculation as shown in FIG. 9, the availability start time need to be shifted using @ATO (availabilityTimeOffset from the manifest, MPD), in order to start downloading segment index #N, which is partially available. Equation 2 will be modified as follow:

$$Seg_N = \lfloor SAST_N \rfloor = \left[\frac{now - @AST - @d + @ATO}{@d}\right]_{floor} + @SN \quad (3)$$

Note, the prefix @ refers to manifest attribute values. "now" is the current time at the client. The client combines the Segment Number $SAST_N$ with the segment template (URL template) to determine the unique segment URL.

Where the ATO value needs to compensate for segment duration, it is ideally equals to ASToffset=@d−fd. Comparing FIG. 9 with FIG. 8 shows that the ATO shifted the download curser to segment index #N. In order for the client to download segment N (latest segment) instead of segment N−1 (segment completely available), the ATO need to shift the SAST by a full segment duration—full fragment duration, if the player doesn't know the fragment length, the ATO should contain the value mentioned in order to get the client to download segment N. This solution doesn't require the knowledge of fragment duration in the MPD.

Equation 3 is suitable for calculating the latest available segment via chunked encoding, but the client will download fragment #1 in segment index #N, however the latest available fragment is #M. Thus, the client will receive unwanted, old fragments.

In order to fine grain the calculation of the segment availability, the client has to know the fragment duration. Using the fragment duration @fd. The client can calculate the latest fragment using equation 4 with the result from equation 3

$$Frag_M = \lfloor FAST_M \rfloor = \left\lceil \frac{now - (Seg_N \times d)}{fd} \right\rceil_{floor} \quad (4)$$

Figure 10:
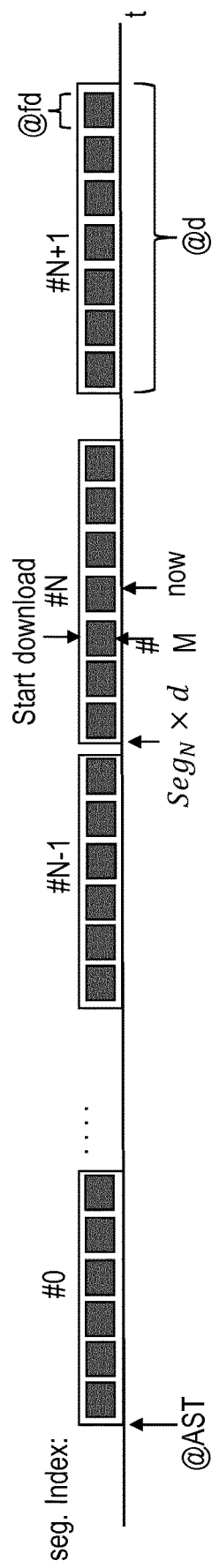
FIG. 10 shows a situation in which chunked encoding is used and the media providing entity is configured to make sure that a tune-in with low latency is possible.

As shown in the FIG. 10, Frag #M is the latest available fragment at seg #N. the client can use the buffer depth information to calculate how many fragments to download before the latest fragment M.

b)

In the above discussed solution a) the client calculated the tune-in fragment. In the following discussion below the tune-in decision is moved to the media providing entity and the client is not required to calculate any fragments or use any special tune-in URL. In this embodiment the fragments of the segment and process are sent along with the initialization segment.

Figure 11:
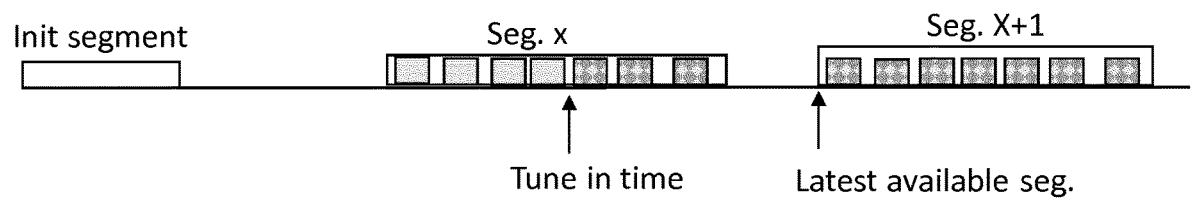
FIG. 11 shows a segment situation as occurring at the media providing entity when a request for tune-in is received.
Figure 12:
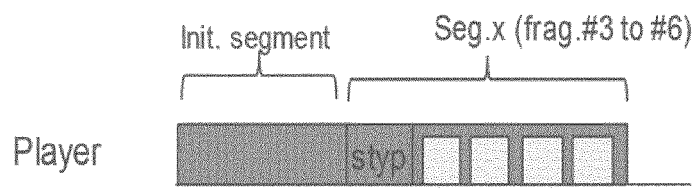
FIG. 12 shows a generated media segment as received at the media player in a situation shown in FIG. 11.

The following steps may be carried out:
1. The mobile player calculates the tune-in segment using the availability start time offset as discussed in more detail below.
2. In the next step the client determines the next available segment as the next segment to start from fragment 0 as shown in FIG. 11.
3. However, the client tune-in occurs during the production of segment X as shown in FIG. 11 where segment X is only partially available and the latest available fragment is fragment 3 if the first fragment is fragment 0 while fragments 4 to 6 are not yet available.
4. In this step the first media segment to be requested by the media player will be segment X+1.
5. Before requesting segment X+1 the media player requests the initialization segment shown in FIG. 11.
6. Optionally, the client sends the request for the initialization segment. By way of example the request can have the following format:
http://ex.com/init.m4s
7. Here the media server responds with the initialization segment via chunked encoding, but it uses the HTTP response to also send the S type box and the remaining fragments of segment X, meaning fragments 3 to 6 in the example shown with the initialization segment response as it is shown in FIG. 12. FIG. 12 indicates the segment as it is received at the media player.
8. The origin can set the cache control header in the HTTP response to "no cache" (or similar) to avoid caching of the modified initialization segment.
9. After the client requests the initialization segment it will request the first available media segment X+1 according to steps 2 and 4 mentioned above.
10. Since the request for segment X+1 is sent directly after the initialization segment is downloaded including the fragments 4 to 6 of segment X, fragment 0 in segment X+1 might not be available yet. In this case two solutions are possible. In a first option the origin can bend the request until segment X+1 is made available, i.e. hanging request, or as an alternative the origin response by 404 not found so that the client is configured to try to fetch the segment once more until the segment is available.

In the following the calculation of the next available segment is discussed.

The calculation of the next available segment (segment X+1) is done slightly similar to the derivation from equation 3, where ATO is used to compensate for the added delay introduced in eq.(2). Equation 3 can be modified as follows:

$$Seg_{x+1} = \lceil SAST_{x+1} \rceil = \left\lceil \frac{now - AST - d + ATO}{d} \right\rceil_{ceil} + @SN \text{---} \rightarrow (5)$$

Where the ATO=d, the fragment duration is not available in the MPD as in section a) solution, the value of ATO in the MPD should be sufficient to allow the client to download seg.x+1 instead of segment x.

Another possible calculation method that does not require any modification in the client calculation algorithm is to increase ATO value, where ATO=1.5×d, where eq.4 can be modified as follows:

$$Seg_{x+1} = \lfloor SAST_{x+1} \rfloor = \left\lceil \frac{now - AST - d + ASToffset}{d} \right\rceil_{floor} + ©SN \text{---} \rightarrow (6)$$

c)

Figure 13:
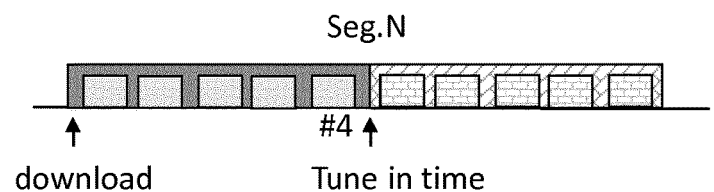
FIG. 13 shows an example situation of a segment in which only a part of the fragments is available at the tune-in time wherein the client still downloads the complete fragment.
Figure 14:
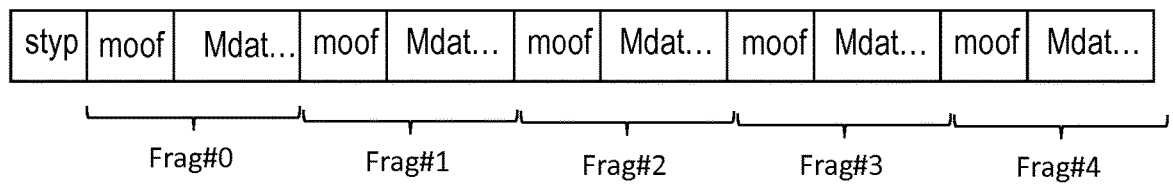
FIG. 14 shows an example representation of the different fragments of the segment as they are received at the media player for a situation as shown in FIG. 13.
Figure 15:
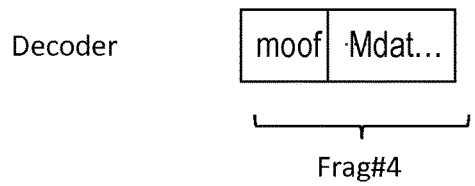
FIG. 15 shows an example representation of the latest fragment that is forwarded to the decoder whereas the other fragments shown in FIG. 14 are discarded.

In the following an embodiment is disclosed where no modification is required at the side of the media providing entity, but wherein the solution takes place in the media player. The media player uses equation 3 to calculate the latest available segment and then the tune-in segment which corresponds to the partially available segment for chunked transfer encoding. As indicated in FIG. 13 this may be segment N. In this scenario the client does not require knowing the latest available fragment but it downloads the segment starting from fragment 0 as shown in FIG. 13. The client downloads fragments 0 to 5 simultaneously while the connection is binding until the rest of the segment is sent. However, while fragments 0 to 3 are downloaded the media player discards them and passes only fragment No. 4 to the decoder to start play out at the live edge. As shown in FIG. 14 the client or media player parses the downloaded chunks via a media parser in order to detect the last fragment boundaries. Each fragment starts with a moot box followed by the Mdat box which contains the data. The media player can use the box size to skip fragments until it reaches the last moot and Mdat box and only fragment 4 and "styp" are forwarded to the decoder as shown in FIG. 15.

d)

Figure 16:
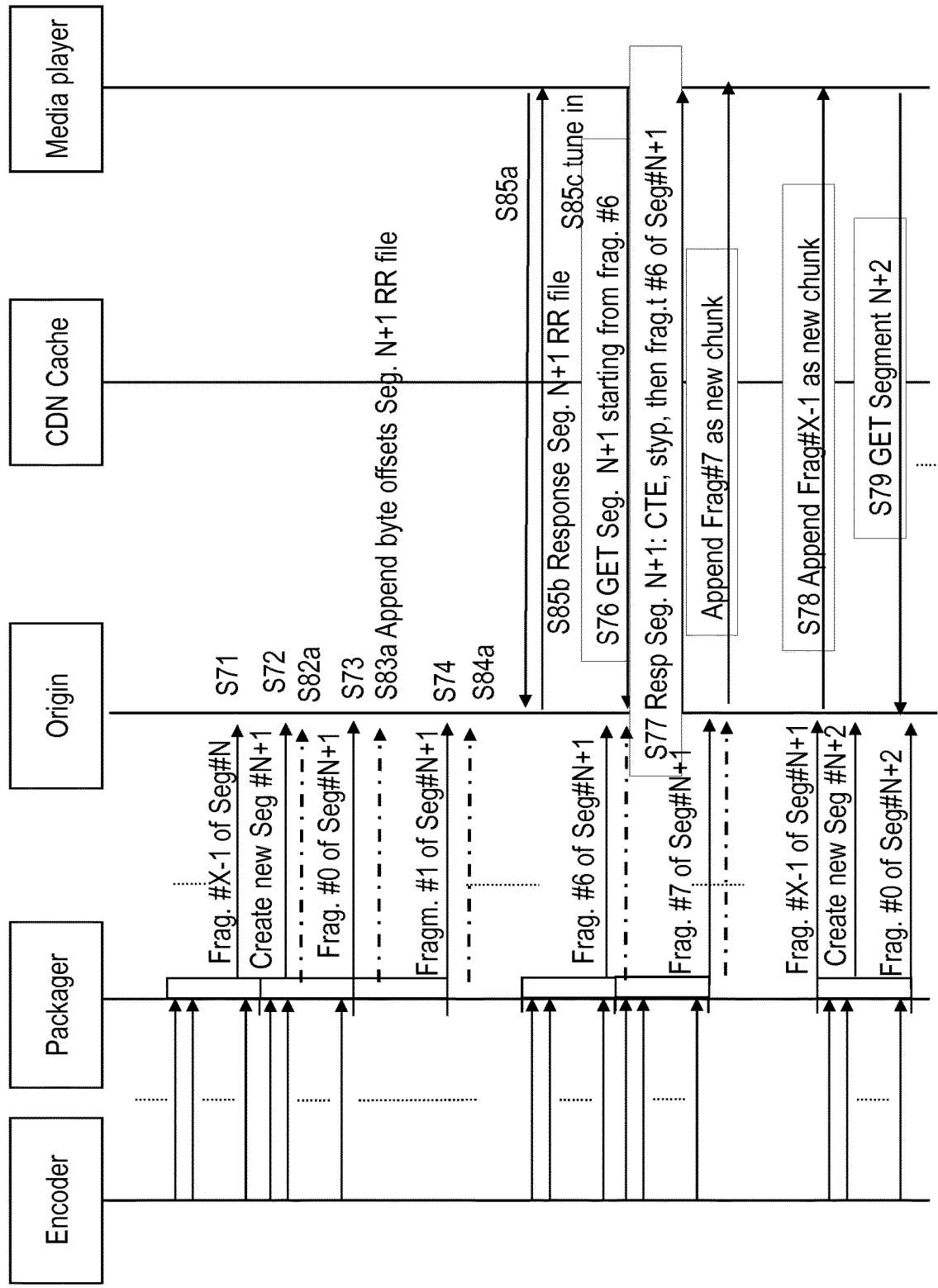
FIG. 16 shows an example message flow between involved entities in which the fragment size is transmitted out of band as a separate file in a range request file.

In the following a solution is discussed in which a fragment-index file is requested separately from the media segment. The fragment index file contains the fragment offsets of the segment in progress. The fragment offsets may be transmitted as a separate file. The MPD defines a URL template for the fragment-index file so that the client can calculate for each segment an associated range offset object. The URL template can also contain the fragment duration. The client (after reception of the fragment index file) can determine the tune-in fragment and calculate for each segment an associated byte-offset for the tune-in fragment. The client first determines the tune-in segment, containing the tune-in fragment. This can be the latest available segment or another segment. The client then requests and receives the fragment index file. After that, the client determines from the fragment index file the byte offset of the tune-in fragment within the tune-in segment. Finally, the client issues an open range byte range request (i.e. HTTP range header is present in the segment request) for the actual media segment. As response, the client receives a partial segment, where the leading fragments in the segment are not provided. FIG. 16 shows a message exchange between the different entities for this embodiment. The method steps having the same reference numeral as the method steps shown in FIG. 7 correspond to the steps explained in connection with FIG. 7 and are not explained in detail anymore. With every new segment the packager creates a separate fragment index file as shown by step S82a where the packager creates a new fragment index file for segment N−1. It only contains information that the first fragment in the segment starts at offset 0. At step S83 the packager makes the first fragment of the segment available, here fragment 0 of segment N+1. Now the size of the first fragment is known and the packager can append the start byte offset for fragment 1 to the range request file as indicated for steps S83a and S84a. The packager continues the procedure for the remaining fragments of the segment. In step S85a the client or media player wants to tune-in. First the client determines the latest available segment and the latest available fragment. Then the client determines the tune-in fragments and segments (here, segment N+1). The client requests the fragment index file for the tune-in segment (i.e. URL for Segment N+1) from the server. In step S85b the range request file is responded containing the range starts for fragment number 0 to fragment number 6. Although fragment number 6 is not available the byte offset of fragment 6 is known. So the client fetches the fragment index file and finds that the offset for fragment number 6 is the last in the list. In step S85C the client issues an HTTP byte range request for segment N−1 containing an open range request for fragment number 6 onwards (meaning, that the range request HTTP header is set to the byte offset of fragment #6). Note, here, the player decided to use the latest available fragment as tune-in fragment. To speed up buffering, the player may use already available fragments, e.g. fragment #4 as tune-in fragment.

There are different ways to format the fragment index file. One option is to have a binary list of byte offsets for each fragment start. Another solution might be to use the segment index box format (i.e. sidx box from ISO/IEC 14496-12). However, other solutions may be used.

The HTTP Range Request header is defined in https://tools.ietf.org/html/rfc7233. An open range request an HTTP request with HTTP range header present and only the first-byte-position set. This indicates a byte range from the first-byte-position onwards until the end of the file.

Example for an open range request is the HTTP header "Range: bytes 100-", where response should only contain from byte offset 100 byte to the end of the file.

In the following we summarize some important steps carried out by the different entities in the different embodiments discussed above.

Figure 17:
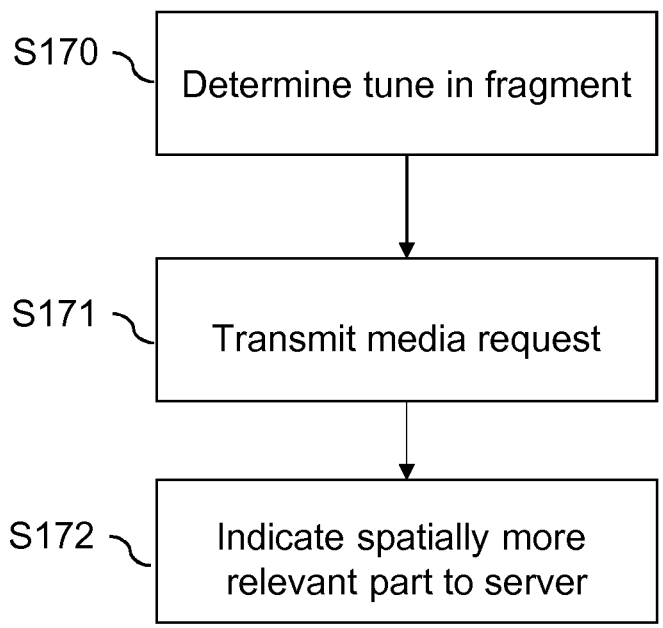
FIG. 17 shows an example flowchart of a method carried out at a media player according to one embodiment of the invention.

In connection with FIG. 17 the steps carried out by the media player are summarized for the embodiment discussed above where a special tune-in segment is generated. The media player determines the tune-in segment in step S170 and especially determines the tune-in fragment of the livestream as discussed above in equations 2 to 4. In step S171 a media request is transmitted towards the media providing entity wherein the media request comprises an indication that the tune-in segment should start with the tune-in fragment as first media fragment. As mentioned above the request may be sent as an HTTP request in which the fragment number is included. The media player then receives in step S172 a media response originating from the media providing entity which comprises the specially designed tune-in segment 50 as shown in FIG. 5 which starts with the indicated fragment as first media fragment.

As far as the media player is concerned further general conclusions can be drawn:

The tune-in segment is received in a segment comprising at the beginning a segment compatibility information followed by the tune-in fragment. As shown in FIG. 5 the tune-in segment 50 contains the styp indication and then fragment number 5 as first media fragment.

For the determination of the tune-in fragment a fragment duration can be determined wherein the tune-in fragment is determined taking into account the determined fragment duration. As mentioned above in equations 2 to 4 the fragment duration d is used for the calculation.

Furthermore, for determining the tune-in fragment the media player may determine the latest available segment which is only partially and not completely available at the media providing entity. The tune-in fragment is then determined taking into account this determined latest available segment as calculated above in equation 2.

Furthermore, the media player may, for determining the tune-in fragment determine an availability start time of the latest available segment of the livestream and may determine the tune-in fragment based on this determined availability start time. Thus the availability start time of the latest fragment is determined, which is the newest fragment appended to the latest available segment.

Furthermore the media player may determine a buffer depths of a media buffer used at the media player for buffering the received livestream and may then determine the tune-in fragment taking into account the determined buffer depths.

As shown in FIG. 7 the media request may be transmitted as an HTTP request to which an indication about the tune-in fragment is added. So the indication can be appended to the request URL or can be added into the HTTP header.

The indication about the tune-in fragment transmitted to the media providing entity can indicate that the tune-in segment should not contain any media fragment of the livestream earlier than the tune-in fragment.

Furthermore, the indication can indicate a fragment number greater than 0 if each segment normally starts with fragment number 0 in counting the fragments.

Figure 5:
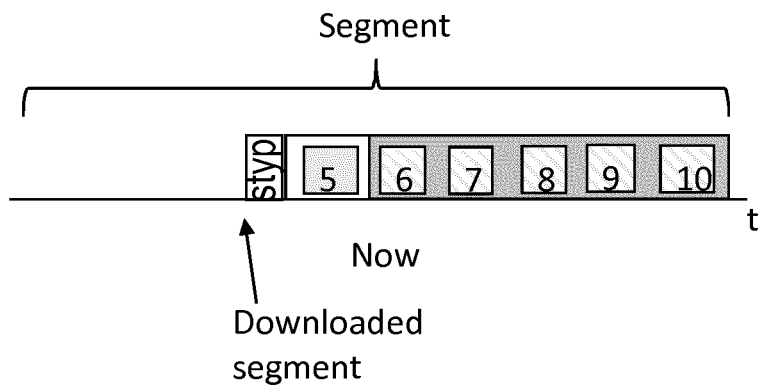
FIG. 5 shows an example representation of a specific tune-in segment which can be used in the invention to minimize delay.

As can be seen from FIG. 5 the tune-in segment comprises a small number of media fragments in comparison to the average number of fragments in the media segments composing the livestream which were shown in FIG. 1, 3, or 4.

Determining the availability start time can comprise the following steps:
- determining the latest available segment,
- determining a latest appended fragment of the latest available segment,
- determining the tune in fragment by deducting a media buffer duration from the latest available fragment,
- determining a segment URL of the tune in fragment. Note that the tune-in fragment may be contained in a different segment that the latest available segment.

Furthermore information from the MPD can be used to generate the media request. The client may use information from the MPD (e.g. additional URL template information) to construct the request for the tune-in segment.

Figure 18:
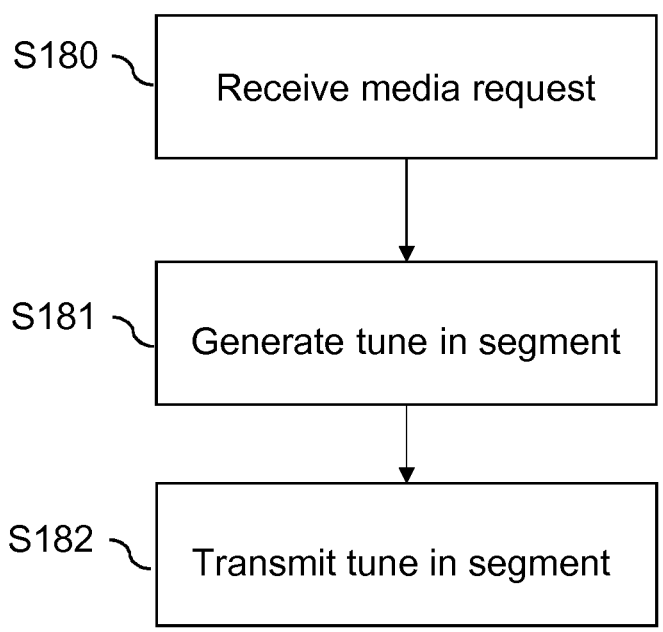
FIG. 18 shows an example flowchart of a method carried out at the media providing entity in a situation where the media player transmits a request as shown in FIG. 17.

FIG. 18 summarizes this step is carried out at the media providing entity in the this embodiment. In step S180 the media providing entity receives the media request which was transmitted by the media player in step S171. The media request comprises an indication about the tune-in fragment in which the media player intends to start consuming the livestream. In step S181 the media providing entity generates the tune-in segment as shown in FIG. 5 which starts with the tune-in fragment as received in the media request as first media fragment. In step S182 the tune-in segment that was generated is then transmitted towards the media player.

As far as the media providing entity is concerned the media providing entity generates the tune-in segment such that it does not contain any media fragment earlier than the tune-in fragment. As shown in FIG. 5 the generated tune-in segment 50 does not contain any fragment before fragment 5 which was the fragment when the tune-in decision was made.

The tune-in segment may be generated such that it comprises at the beginning an indication indicating a media compatibility information followed by the tune-in fragment having a fragment number greater than 0 assuming that the fragment counting is normally started at zero. The segment compatibility indication should occur at the beginning of the segment. Thus media data are removed, but the media compatibility information is left.

As the received media request was an HTTP request, the media response can also be transmitted as an HTTP response in response to the received request.

Furthermore it is possible to use chunked encoding for transmitting the media response, wherein the tune-in segment is generated such that a first chunk of the tune-in segment comprises an indication that a new segment in the media stream is arriving followed by the tune-in fragment.

The media providing entity may generate cache control information for a cache memory for the generated tune-in segment, the cache control information indicating to the cache memory that the tune-in segment should be removed from the cache memory faster than the other segments of the live stream.

Figure 19:
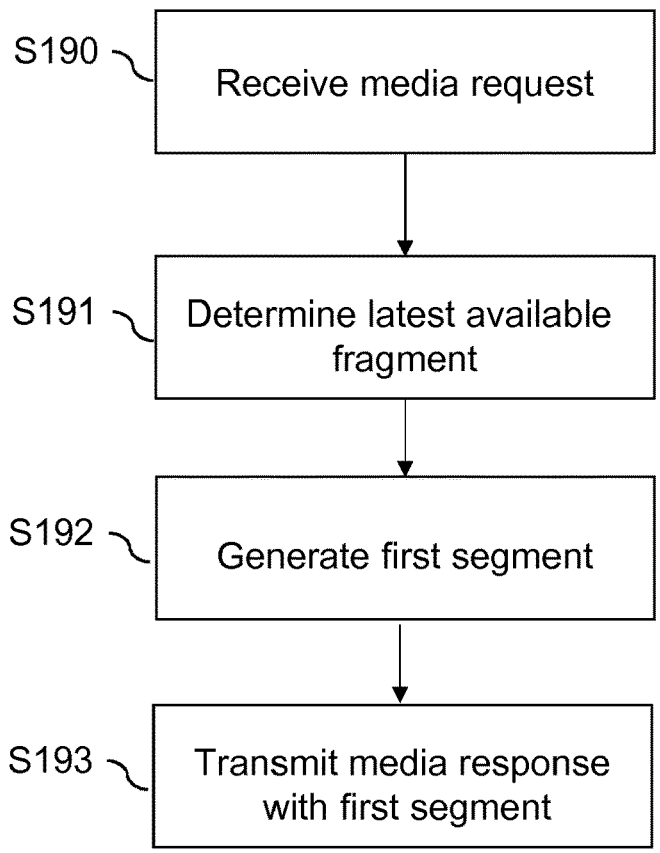
FIG. 19 shows an example schematic representation of a flowchart of a method carried out at a media providing entity according to a further embodiment.

FIG. 19 summarizes the steps carried out at the media providing entity in embodiment b) discussed above where the fragments of the segment in progress are sent along with the initialization segment. The media providing entity receives a media request in step S190 requesting initialization information of the live stream at a moment where a segment x is the latest available segment at the media providing entity and for which not all M media fragments are already available when the media request is received. In step S191 the media providing entity determines a latest available fragment in the segment X that is available when the media request is received. The media providing entity then generates in step S192 a first segment of the livestream which comprises the initialization information and comprises the latest available fragment of segment X and the remaining fragments of segment X following the latest available fragment. The generated first segment is then transmitted as media response to the media player in step S193.

The first segment can comprise the initialization information followed by an indication indicating a media compatibility information, the indication being followed by the number Y of fragments, with Y<M.

After receiving the media request for the initialization information the media providing entity can then receive a second request which is a request for a segment x+1 which is the subsequent segment after segment x. Segment x+1 is the segment which the media player transmitting the media request calculated to be the first media segment of the live stream to be received, i.e. the segment with which the live stream should start. The media player determines segment x+1 using an availability time offset, ATO, contained in the MPD. One example for the calculation is given by equation (5).

Furthermore the tune-in segment maybe generated such that is does not contain any media fragment earlier than the tune-in fragment. Additionally the tune-in segment is generated such that it comprises at the beginning an indication indicating a media compatibility information followed by the tune-in fragment having a fragment number greater zero assuming that the fragment number of the segment is counted normally from zero.

As far as embodiment b) is concerned discussed above where the fragments of the segment are sent along with the initialization segment as shown in FIGS. 11 and 12, the media providing entity receives a media request for the initialization information and the media providing entity then generates a first segment of the livestream which comprises the initialization information and fragments of the segment that is only partially available when the media request is received. The first segment comprises the fragments that will generated after the media request is received. Accordingly this first segment comprises the initialization information followed by an indication that a new segment has started wherein this indication is again followed by the number Y of fragments where the number Y is smaller than the number M of media fragments normally contained in the segments.

Figure 20:
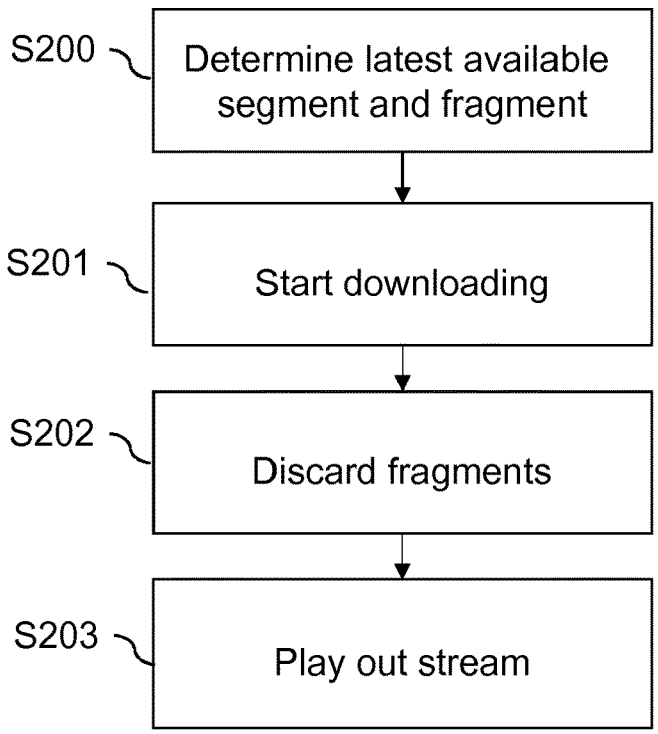
FIG. 20 shows an example representation of a flowchart of steps carried out at a media player according to a further embodiment of the invention.

FIG. 20 summarizes the steps carried out by the media player in the embodiment c) discussed above where the media player downloads all fragments of the latest segment but discards some of the fragments. In step S200 the media player determines a number of the latest available segment of the livestream which is available at the media player and for which not all of the fragments are available, but only Y fragments with Y being smaller than M. Furthermore the latest available fragment is determined and a tune-in fragment is determined based on the latest available fragment and a buffer depth of a buffer used at the media player. In step S201 the media player starts downloading the latest available segment including the number Y of fragments. The media player then discards from the Y fragments all fragments until the latest available fragment among the Y fragments is reached in step S202 and plays out the livestream with the latest available fragment among the Y fragments as first media fragment in step S203.

As far as this embodiment c) is concerned where the media player simply discards all of the fragments of the latest segment except the last fragment as shown in FIG. 13, the media segments normally comprise M media fragments wherein Y fragments are received when the download has started. From his Y fragments only the latest available fragment among the Y fragments after the tune-in fragment and fragments starting from Y+1 are forwarded to the decoder whereas all other of the Y fragments are discarded. In the example shown in FIG. 13 the media player receives the fragments with the number 0 to 4 and only fragment 4 is forwarded and all fragments having a greater fragment number than 4.

Figure 21:
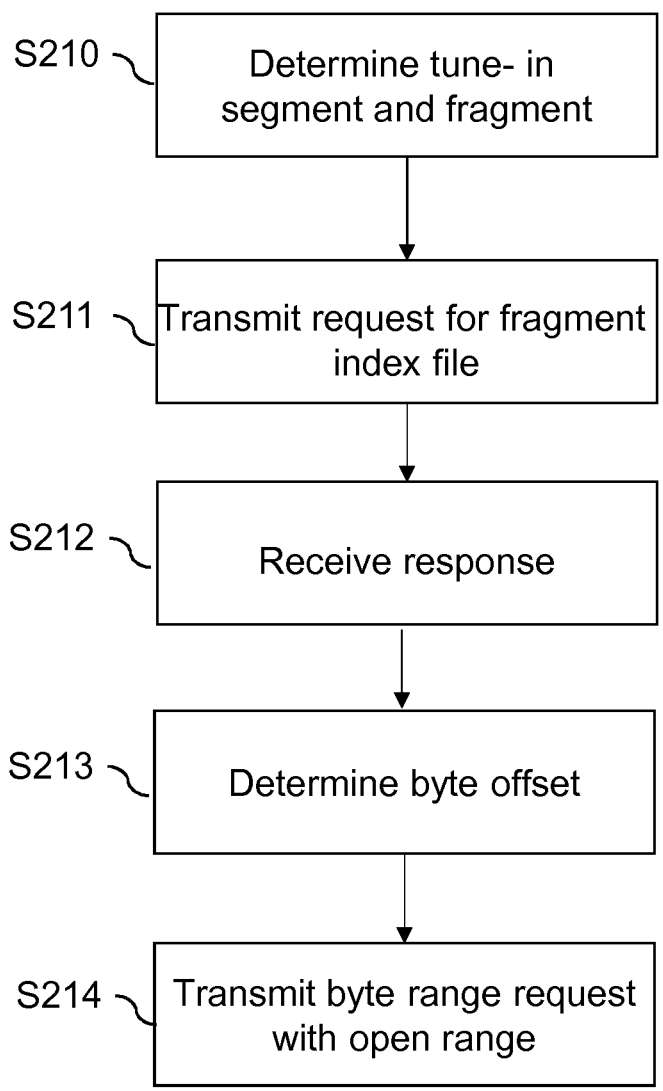
FIG. 21 shows an example representation of a method carried out at a media player according to a further embodiment.

FIG. 21 summarizes the steps carried out by the media player in the embodiment d) mentioned above where the out of band transmission is used. In step S210 the media player determines a tune-in segment and a tune-in fragment of the live stream, at which the media player intends to start consuming the live stream. In step S211 a request for a fragment index file towards a media providing entity is transmitted to the video providing entity wherein the fragment index file comprises offset information allowing the media player to determine by how many bytes the tune-in fragment is offset from the beginning of the tune-in segment. In step S212 a response is received from the video providing entity wherein the response comprises the requested offset information. In step S213 the byte offset of the tune-in fragment in the tune-in segment is determined based on the received offset information, and in step S214 a byte range request is transmitted towards the media providing entity, the byte range request being an open range request requesting a transmission of the tune-in segment starting with the fragments after the byte offset such that the tune-in segment comprises as fragments the tune-in fragment as first media fragment in the open range and any later fragments of the tune-in segment after the tune-in fragment.

Furthermore the media player may determine the latest available segment which is only partially and not completely available at the media providing entity and the latest available fragment in the latest available segment, wherein the latest available fragment is selected as tune-in fragment. Additionally the response received in response to the transmitted request may comprise the byte offset values for each fragment of the tune-in segment.

The request for the fragment index file may be transmitted in a separate message separately from other messages transmitted towards the media providing entity.

An information provided in a media presentation description, MPD, is used to generate the request for the fragment index file, wherein the request for the fragment index file is generated as a URL. Furthermore an information provided in a media presentation description, MPD, is used to generate the byte range request in the form of a URL.

Thus the media player may use information from the MPD (e.g. additional URL template information) to construct the request for the tune-in segment (in option a discussed above) or construct the URL for the fragment-index file (for option d) or more generally, that the MPD contains information to construct two URLs, one for the fragment-index file and the second one for the media segment.

As far as the media player in general is concerned, a media presentation description, MPD, comprising information about a fragment duration such as a tune-in interval or the tune-in fragment duration is received, wherein a latest available fragment corresponding to a newest fragment available at the media providing entity when the media request is received at the media providing entity is determined using the fragment duration (tune-in interval or the tune-in fragment duration) deduced from the media presentation description.

The different aspects discussed above mainly relate to the DASH technology.

Figure 22:
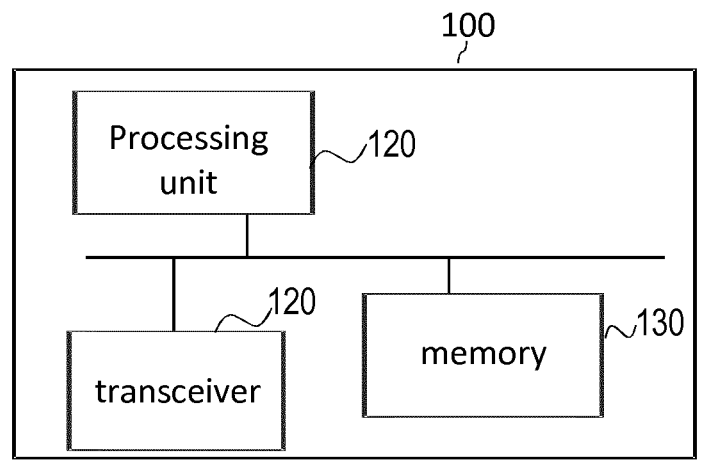
FIG. 22 shows a schematic representation of a media player involved in the different embodiments discussed in the figures above.

FIG. 22 shows a schematic architectural view of a media player 100 which can carry out the above discussed options in which the media player is involved in the different embodiments. The media player 100 comprises a transceiver 110 which is provided for transmitting user data and control messages to other entities such as towards the media providing entity for requesting a media file. The transceiver is furthermore provided for receiving user data and control messages from other entities such as the media stream from the media providing entity. The media player furthermore comprises a processing unit 120 which is responsible for the operation of the media player 100. The processing entity comprises one or more processors and can carry out instructions stored on a memory 130, wherein the memory may include a read-only memory, a random access memory, a mass storage, a hard disk or the like. The memory 130 can furthermore include suitable program code being executed by the processing unit 120 so as to implement the above described functionalities in which the media player 100 is involved.

Figure 23:
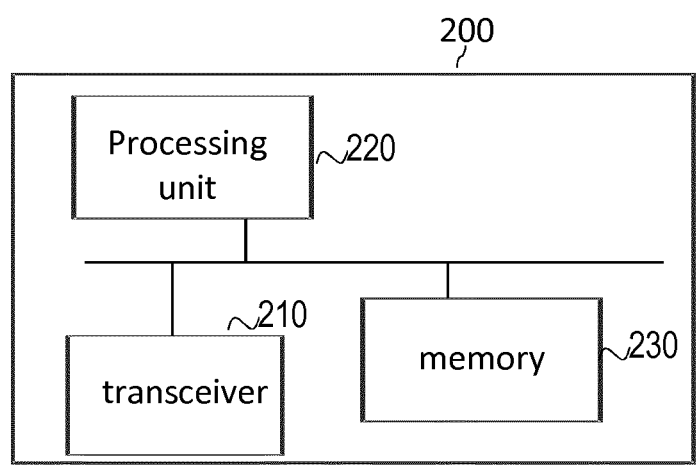
FIG. 23 shows an example schematic representation of a media providing entity involved in the different embodiments discussed in the figures above.

FIG. 23 shows a schematic architectural view of a media providing entity 200 which can carry out the above discussed steps in which the media providing entity is involved. The media providing entity comprises a transceiver 210 used for transmitting user data such as the livestream or control messages to other entities such as the media player 100. The transceiver 210 is furthermore used to receive user data and control messages from other entities. The media providing entity comprises a processing unit 220 which is responsible for the operation of the media providing entity 200. The processing entity 220 comprises one or more processors and can carry out instructions stored on a memory 230, wherein the memory can include a read-only memory, a random access memory, a mass storage, hard disk or the like. The memory 230 can furthermore include suitable program code to be executed by the processing unit 220 so as to implement the above described functionalities in which the media providing entity is involved.

Additionally, the Media Presentation Description, MPD, may be amended as follows:
  Indication, that Fast Tune-In is supported by the offering;
  Information, how the tune-in segment is requested. The tune-in segment is a media segment, which does not contain all fragments. Leading fragments are removed.
  Information like the fragment duration, which helps the player to determine the tune-in fragment based on the latest available segment.
  Then, there are several alternatives for construct the request for tune-in segments
  Alt 1: Tune-In information is added in the Request URL
    URL template information to describe, how the URL for a tune-in segment is created. For example, an additional path element is inserted or appended.
    The server, which receives the URL, parses the tune-in fragment information form the URL and creates a special tailored tune-in segment
    The server may optionally add short cache control headers, since this tune-in segment is only of short usage
  Alt 2: Tune-In information is added into the Request Headers. Two requests are needed for this solution.

Here, the MPD first needs to have an indication for a fragment-index file, which should be separately requested. The fragment-index file contains the byte offsets of fragments. The fragment index file is specific for each segment, thus, the segment number of segment URL needs to be first determined When the client has fetched the fragment index file, the client determines the byte offset of the tune-in fragment.

A byte range request (i.e. the standard HTTP range header is added to the request) is issues for the tune-in segment, carrying the byte offset of the tune-in fragment.

In the following a possible implementation of the MPD is given:

```
<MPD availabilityStartTime="2017-04-11T07:06:51.275000Z"
minBufferTime="PT2.00S" minimumUpdatePeriod="PT5.00S"
profiles="urn:mpeg:dash:profile:isoff-live:2011" publishTime="2017-04-
11T07:06:54.305000Z" timeShiftBufferDepth="PT2M0.00S" type="dynamic"
xsi:schemaLocation="urn:mpeg:dash:schema:mpd:2011 DASH-MPD.xsd">
<Period id="1" start="PT0.00S">
<AdaptationSet codecs="avc1.640028" contentType="video"
maxBandwidth="613221" maxFrameRate="30" maxHeight="1080" maxWidth="1920"
mimeType="video/mp4">
<SegmentTemplate duration="15" initialization="$RepresentationID$/Header.m4s"
media="$RepresentationID$/$Number$.m4s" presentationTimeOffset="1"
startNumber="1" timescale="15"/>
<Representation bandwidth="613221" frameRate="30" height="1080" id="video"
width="1920"/>
<InbandEventStream schemeIdUri="urn:mpeg:dash:event:2012"/>
<InbandEventStream schemeIdUri="urn:ericsson:events4graphics:2016"/>
</AdaptationSet>
<AdaptationSet audioSamplingRate="48000" codecs="mp4a.40.2"
contentType="audio" lang="und" maxBandwidth="129228" mimeType="audio/mp4">
<SegmentTemplate duration="1" initialization="$RepresentationID$/Header.m4s"
media="$RepresentationID$/$Number$.m4s" presentationTimeOffset="0"
startNumber="1" timescale="1"/><Representation bandwidth="129228" id="audio"/>
</AdaptationSet>
</Period>
</MPD>
```

Summarizing the above discussed solutions allow a fast tune-in to livestreams with a low latency. The livestream is operating with comparatively large and long segment durations between 6 and 10 sec where each segment is subdivided into multiple fragments.

The invention claimed is:

1. A method for operating a media providing entity, which provides a live stream to a media player, the live stream comprising a sequence of media segments, each media segment comprising a plurality of media fragments, the method comprising:
receiving a media request comprising an indication about a tune-in fragment of a tune-in segment at which the media player intends to start consuming the live stream, the indication comprising a segment number indicating the tune-in segment and a fragment number indicating the tune-in fragment, and indicating that the tune-in segment should start with the tune-in fragment as a first media fragment, wherein the media request is received as an HTTP request to which the indication about the tune-in fragment is added in a URL;
determining the tune-in fragment from the URL;
generating the tune-in segment which starts as the first media fragment with the tune-in fragment and which comprises a number of media fragments that is smaller than an average number of fragments contained in the other segments of the live stream;
transmitting the tune-in segment with a media response towards the media player, wherein the media response is transmitted as an HTTP response;
receiving a subsequent media request for a segment following the tune-in segment;
generating the segment following the tune-in segment comprising the average number of fragments; and
transmitting the segment following the tune-in segment in a direction of the media player.

2. The method of claim 1, wherein the tune-in segment is generated such that is does not contain any media fragment earlier than the tune-in fragment.

3. The method of claim 1, wherein the tune-in segment is generated such that it comprises at a beginning an indication indicating a media compatibility information followed by the tune-in fragment having a fragment number greater zero.

4. The method of claim 1, further generating cache control information for a cache memory for the generated tune-in segment, the cache control information indicating to the cache memory that the tune-in segment should be removed from the cache memory faster than the other segments of the live stream.

5. The method of claim 1 further comprising using chunked encoding for transmitting the media response, and generating the tune-in segment such that a first chunk of the tune-in segment comprises an indication that a new segment in the live stream is arriving, followed by the tune-in fragment.

6. A media providing device configured to provide a live stream to a media player, wherein the live stream comprises a sequence of media segments, with each media segment comprising a plurality of media fragments, the media providing device comprising:
processing circuitry; and
memory circuitry configured to store instructions executable by the processing circuitry, whereby the media providing device is configured to:
receive a media request comprising an indication about a tune-in fragment of a tune-in segment at which the media player intends to start consuming the live stream, the indication comprising a segment number indicating the tune-in segment and a fragment number indicating the tune-in fragment, and indicating that the tune-in segment should start with the tune-in fragment as a first media fragment, wherein the media request is received as an HTTP request to which the indication about the tune-in fragment is added in a URL;

determine the tune-in fragment from the URL;

generate the tune-in segment which starts as the first media fragment with the tune-in fragment and which comprises a number of media fragments that is smaller than an average number of fragments contained in other segments of the live stream;

transmit the tune-in segment with a media response towards the media player, wherein the media response is transmitted as an HTTP response;

receive a subsequent media request for a segment following the tune-in segment;

generate the segment following the tune-in segment comprising the average number of fragments; and transmit the segment following the tune-in segment in a direction of the media player.

7. The media providing device of claim 6, wherein the media providing device is further configured to generate the tune-in segment such that it does not contain any media fragments earlier than the tune-in fragment.

8. The media providing device of claim 6, wherein the media providing device is further configured to generate the tune-in segment such that it comprises, at a beginning, an indication indicating a media compatibility information followed by the tune-in fragment having a fragment number greater zero.

9. The media providing device of claim 6, wherein the media providing device is further configured to generate cache control information for a cache memory for the generated tune-in segment, the cache control information indicating to the cache memory that the tune-in segment should be removed from the cache memory faster than the other segments of the live stream.

10. The media providing device of claim 6 herein the media providing device is further configured to use chunked encoding for transmitting the media response, and to generate the tune-in segment such that a first chunk of the tune-in segment comprises an indication that a new segment in the live stream is arriving, followed by the tune-in fragment.

* * * * *